United States Patent
Neergaard

(10) Patent No.: US 9,661,865 B2
(45) Date of Patent: May 30, 2017

(54) CHEWING GUM COMPRISING POLYETHYLENE

(75) Inventor: Jesper Neergaard, Aarhus C (DK)

(73) Assignee: MONDELEZ UK HOLDINGS & SERVICES LIMITED, Uxbridge, Middlesex (GB)

( * ) Notice: Subject to any disclaimer, the term of this patent is extended or adjusted under 35 U.S.C. 154(b) by 895 days.

(21) Appl. No.: 12/443,653

(22) PCT Filed: Sep. 29, 2006

(86) PCT No.: PCT/DK2006/000538
§ 371 (c)(1),
(2), (4) Date: Mar. 30, 2009

(87) PCT Pub. No.: WO2008/037251
PCT Pub. Date: Apr. 3, 2008

(65) Prior Publication Data
US 2009/0304857 A1    Dec. 10, 2009

(51) Int. Cl.
*A23G 4/08* (2006.01)
*A23G 4/18* (2006.01)
*A23G 4/20* (2006.01)

(52) U.S. Cl.
CPC ...... *A23G 4/08* (2013.01); *A23G 4/18* (2013.01)

(58) Field of Classification Search
CPC .............. A23G 4/08; A23G 4/18; A23G 4/20
USPC ............................... 426/3, 5, 548, 560
See application file for complete search history.

(56) References Cited

U.S. PATENT DOCUMENTS

| | | | | |
|---|---|---|---|---|
| 3,159,491 A * | 12/1964 | Mahan | | 426/6 |
| 3,285,750 A * | 11/1966 | Ishida | | 426/4 |
| 3,857,964 A | 12/1974 | Yolles | | |
| 4,452,820 A * | 6/1984 | D'Amelia et al. | | 426/3 |
| 4,683,138 A | 7/1987 | Glass et al. | | |
| 4,726,953 A | 2/1988 | Carroll et al. | | |
| 4,907,605 A * | 3/1990 | Ray | A61M 15/06 | 131/270 |
| 5,110,607 A | 5/1992 | Yang | | |
| 5,342,631 A | 8/1994 | Yatka | | |
| 5,792,494 A * | 8/1998 | Kanca et al. | | 426/3 |
| 6,458,400 B1 * | 10/2002 | Willibald-Ettle et al. | | 426/548 |
| 6,630,182 B1 | 10/2003 | Warrington et al. | | |
| 6,703,000 B2 * | 3/2004 | Ning et al. | | 424/58 |
| 2003/0113519 A1 * | 6/2003 | Wasserman et al. | | 428/195 |
| 2004/0115305 A1 * | 6/2004 | Andersen et al. | | 426/3 |
| 2006/0247332 A1 * | 11/2006 | Coffey et al. | | 523/351 |
| 2008/0039575 A1 * | 2/2008 | Mercx | | 524/496 |
| 2008/0286409 A1 * | 11/2008 | Topsoe et al. | | 426/5 |
| 2009/0311368 A1 * | 12/2009 | Wittorff | | 426/5 |

FOREIGN PATENT DOCUMENTS

| | | | | |
|---|---|---|---|---|
| EP | 0 134 120 | 3/1985 | | |
| WO | 92/02145 | 2/1992 | | |
| WO | 97/02273 | 1/1997 | | |
| WO | 00/25598 | 5/2000 | | |
| WO | 03/063604 | 8/2003 | | |
| WO | WO2005/074701 | * 8/2005 | ............... | A23G 1/00 |

OTHER PUBLICATIONS

NPL "Powders and Granules" retrieved on Sep. 9, 2011.*
NPL Lewis in Lewis RJ Sr.: Hawley's Condensed Chemical Dictionary 14th edition . John Wiley & Sons, Inc. NY p. 894, 2001.*
Martindale, The Extra Pharmacopoeia 28th edition, "Disinfectants and Antiseptics"; pp. 547-578; 1982.
US Code of Regulations, CFR, title 21; "Food and Drug Administration, HHS"; pp. 67-68; Jul. 1, 2007.
International Search Report PCT/DK2006/000538; Jul. 31, 2007.
R.S. Manly and B.G. Bibby; Substance capable of decreasing the acid solubility of tooth enamel; pp. 160-171, J.D. Res., v.28, No. 2 (Apr. 1949).
H.P. Fiedler, Lexikon der Hilfstoffe für Pharmacie, Kosmetik und Angrenzende Gebiete, pp. 63-64 (1981) discloses different examples of types of surfactants. These may be used as solubilizers in a chewing gum composition according to embodiments of the invention. "Tenside, die fur die Herstellung pharmazeutischer und/oder kosmetischer Praparate verwendet werden".
Barney H. Hunter and Robert T. Talbert; Pharmacy International Nov. 1985; trends review; "Calcium Channel Blockers 1: a review of their mechanisms of action"; pp. 267-271.

* cited by examiner

*Primary Examiner* — Jill Warden
*Assistant Examiner* — Bhaskar Mukhopadhyay
(74) *Attorney, Agent, or Firm* — Cantor Colburn LLP

(57) ABSTRACT

The present invention relates to a chewing gum comprising at least one polyethylene (PE) polymer in an amount from about 15% to about 99% by weight of the elastomeric polymer content of said chewing gum, at least one synthetic elastomer chosen from the group of Polyisobutylene (PIB), Butyl Rubber, Polyisoprene and Styrene Butadiene Rubber (SBR) in an amount from about 1% to about 85% by weight of the elastomeric polymer content of said chewing gum and wherein said at least one polyethylene polymer has a molecular weight (Mw) above 25,000 g/mol.

13 Claims, 2 Drawing Sheets

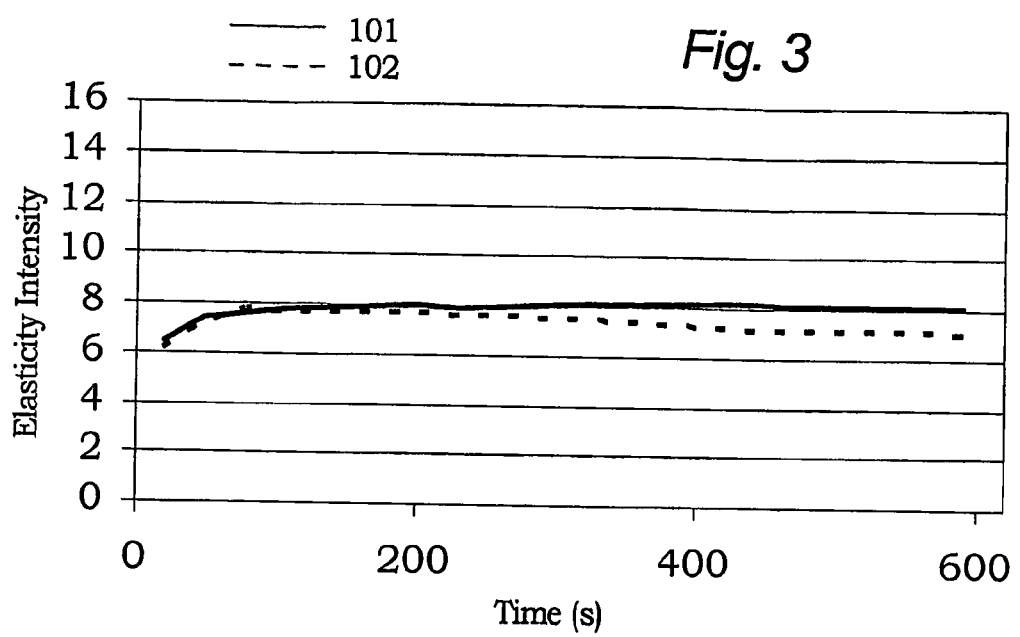

CHEWING GUM COMPRISING POLYETHYLENE

FIELD OF THE INVENTION

The invention relates to a chewing gum comprising polyethylene.

BACKGROUND OF THE INVENTION

Polyethylene polymers are known from a number of applications in the prior art. In relation to chewing gum formulations, polyethylene polymers have shown the ability to soften and to prevent tackiness of chewing gum manufactured in formulations comprising resins, elastomers, fillers, waxes and flavours.

Previously, however, chewing gum formulations with suitable chewing gum characteristics comprising a combination of polyethylene polymers and synthetic elastomers have not been presented.

SUMMARY OF THE INVENTION

The invention relates to a chewing gum comprising at least one polyethylene (PE) polymer in an amount from about 15% to about 99% by weight of the elastomeric polymer content of said chewing gum, at least one synthetic elastomer chosen from the group of Polyisobutylene (PIB), Butyl Rubber, Polyisoprene and Styrene Butadiene Rubber (SBR) in an amount from about 1% to about 85% by weight of the elastomeric polymer content of said chewing gum and wherein said at least one polyethylene polymer has a molecular weight (Mw) above 25,000 g/mol.

THE DRAWINGS

The invention will now be described with reference to the drawings of which

Figure 1:
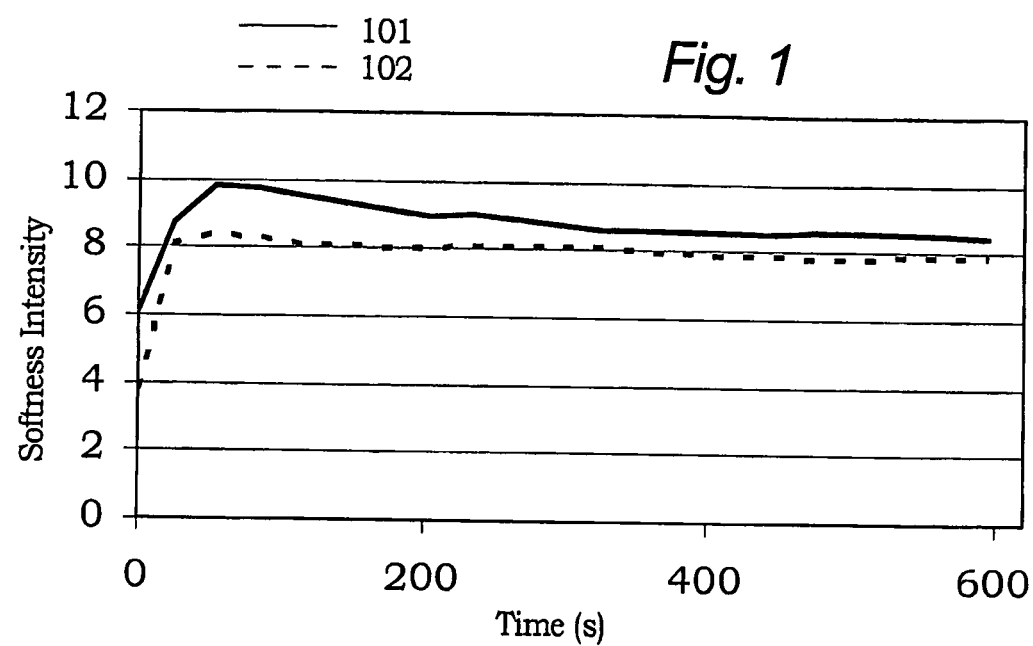
Figure 2:
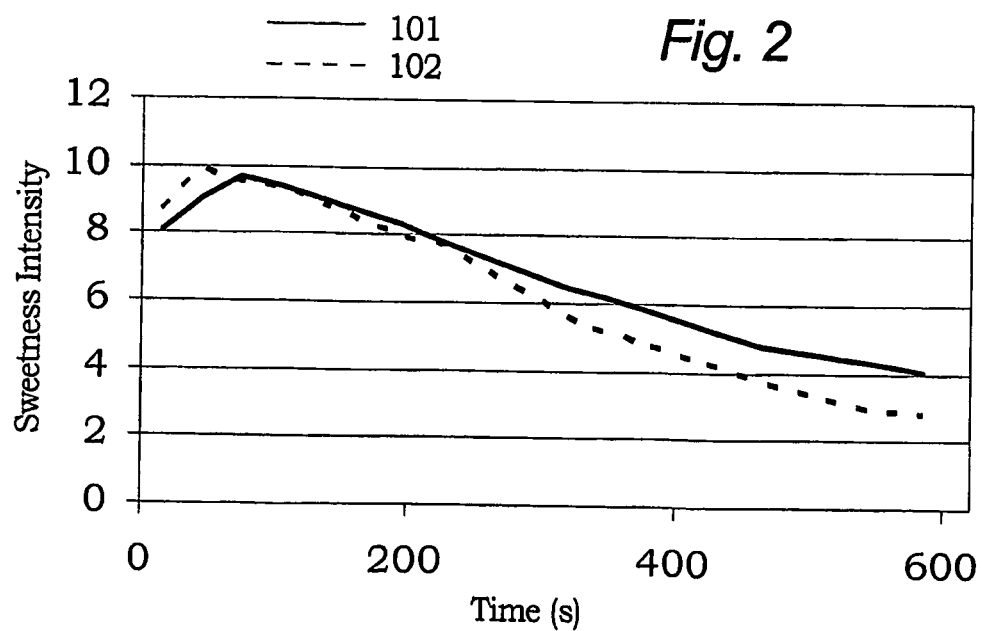

FIG. 1 illustrates the result of a sensory evaluation test where softness intensity is investigated for chewing gums with and without PE, FIG. 2 illustrates the result of a sensory evaluation test where sweetness intensity is investigated for chewing gums with and without PE, FIG. 3 illustrates the result of a sensory evaluation test where elasticity intensity is investigated for chewing gums with and without PE.

DETAILED DESCRIPTION

According to the present invention it has surprisingly been found that polyethylene in combination with another synthetic elastomer possesses useful elastomeric abilities in a broad range of PE-content of the elastomeric polymer content of the chewing gum.

Furthermore it has been found, that in order for the polyethylene to act as an elastomer or provide the desired robustness to the gum base or the final chewing gum it is preferred for it to have a molecular weight (Mw) above about 25,000 g/mol.

Without being bound by theory it is believed that for chewing gums comprising polyethylene having molecular weights below about 25,000 g/mol the result is that desired elasticity may be very difficult to obtain, resulting in a plastic feeling when chewed and the release profile of in particular hydrophilic chewing gum components may become too sudden whereas a molecular weight above the designated limit may result in a more constant release of hydrophilic components, thereby in particular avoiding that hydrophilic chewing gum components are released much too fast during the initial phase of the chewing.

The use of polyethylene is in particular interesting from an economical point of view. This is due to the fact that polyethylene is a low-cost polymer and hence the replacement of more expensive elastomers by polyethylene is advantageous. With the economical goal in mind, a chewing gum with identical properties than a comparative chewing gum is interesting for producing a chewing gum.

A cheaper chewing gum might be attractive all over the world; however it is obviously most advantageous on markets, where consumers graduate price over quality.

According to the invention the further synthetic elastomer may be Polyisobutylene (PIB), Butyl Rubber, Polyisoprene, Styrene Butadiene Rubber (SBR) or any combination of these. These have all proven able to provide sufficient elastomeric properties in combination with high amounts of polyethylene.

In an embodiment of the invention said polyethylene polymer is at least partly elastomeric.

Preferably the polyethylene in the chewing gum is elastomeric and at least partly elastic properties of the polyethylene are required according to the invention. However in order to obtain an acceptable elasticity of the chewing gum, the polyethylene polymer does not necessarily have to be fully elastic as the supplementing additional synthetic elastomer may provide the necessary elastomeric properties as long as the molecular weight of the PE is above 25,000 g/mol (Mw).

If the molecular weight of the PE becomes too low a high amount of supplementary elastomers may be used to avoid that the undesired properties of PE dominates the final chewing gum.

In an embodiment of the invention said polyethylene polymer is a polyethylene elastomer.

In an embodiment of the invention said chewing gum comprises at least one polyethylene polymer in an amount from about 20% to about 90% by weight of the elastomeric polymer content of said chewing gum.

The amount of polyethylene polymer in the chewing gum should be 15% to 99% by weight of the elastomeric polymer content, preferably 15% to 95% by weight of the elastomeric polymer content, more preferably 20% to 90% by weight of the elastomeric polymer content, even most preferably 25% to 85% by weight of the elastomeric polymer content.

In preferred embodiments of the invention, the amount of polyethylene polymer is in the range of 25%-80%, preferably 30%-70% by weight of the elastomeric polymer content of the chewing gum.

In an embodiment of the invention said chewing gum comprises at least one polyethylene polymer in an amount from about 30% to about 80% by weight of the elastomeric polymer content of said chewing gum.

In an embodiment of the invention said at least one polyethylene polymer has a molecular weight (Mw) above 45,000 g/mol.

Although the Mw of 25,000 g/mol for the applied polyethylene polymer has been found to be lower limit for obtaining an acceptable elasticity of the chewing gum, a molecular weight (Mw) above 35,000 is preferred, above 45,000 g/mol more preferred. Even more preferred is a molecular weight (Mw) above 55,000 g/mol.

Thus, an increased molecular weight of the PE, preferably above about 45,000 g/mol (Mw), may in practice result in a more robust gum base with reduced undesired plasticity if the synthetic elastomers according to the invention are mixed together with the PE in the final gum base of chewing gum.

In an embodiment of the invention said at least one polyethylene polymer has a molecular weight (Mw) above 65,000 g/mol.

Molecular weights (Mw) above 65,000 g/mol are preferred, even more preferably the molecular weights (Mw) of the polyethylene polymers are above 75,000 g/mol.

It is believed that the higher the molecular weight of the used polyethylene, the lower is the need for keeping the molecular weight of the further synthetic elastomers high.

In an embodiment of the invention said chewing gum comprises said polyethylene polymer in an amount from 1% to 30% by weight of the chewing gum.

The lower limit according to the present invention relies on the necessity of a certain part of the chewing gum being constituted by elastomeric polymers, and at least a part of the conventional elastomers should be replaced with PE.

On the other hand, there is an upper limit of the PE-content above which the chewing gum properties may not be acceptable according to the invention.

The amount of polyethylene present in the chewing gum is favorable below 30%, preferably below 20%, more preferably below 10% by weight of the chewing gum. Most preferably the amount of polyethylene present in the chewing gum is between 1.5% and 4%.

In an embodiment of the invention said chewing gum comprises said polyethylene polymer in an amount from 1% to 60% by weight of the gum base, preferably in an amount of 1% to 40% by weight of the gum base.

In an embodiment of the invention said chewing gum comprises said polyethylene polymer in an amount from 1.5% to 30% by weight of the gum base.

In an embodiment of the invention said chewing gum comprises said polyethylene polymer in an amount from 2% to 15% by weight of the gum base.

In an embodiment of the invention said chewing gum comprises said polyethylene polymer in an amount from 1.5% to 25% by weight of the chewing gum.

In an embodiment of the invention said chewing gum comprises said polyethylene polymer in an amount from 2% to 20% by weight of the chewing gum.

In an embodiment of the invention said at least one polyethylene polymer is chosen from the group of LDPE, MDPE, VLDPE and LLDPE.

Polyethylene is typically classified according to the density of the polymers. Preferred classes to be used according to the present invention is LDPE (low density PE), MDPE (medium density PE), VLDPE (very low density PE) and LLDPE (linear low density PE). These classes have densities for polyethylenes lying in the range of about 0.880 g/cm$^3$ to about 0.940 g/cm$^3$.

In an embodiment of the invention said chewing gum comprises at least two polyethylene polymers selected from the group consisting of LDPE, MDPE, VLDPE, LLDPE or any combination thereof.

In an embodiment of the invention said at least one polyethylene polymer has a density between 0.880 g/cm$^3$ and 0.940 g/cm$^3$.

In an embodiment of the invention said at least one polyethylene polymer has a crystallinity of less than 70%.

The crystallinity of the polyethylene polymer may be of great importance for the characteristics of the final chewing gum product. A polyethylene with a very high crystallinity may result in a more plastic product. Hence a crystallinity of less than 70% is preferred.

In an embodiment of the invention said at least one polyethylene polymer has a crystallinity of less than 50%.

In an embodiment of the invention said at least one polyethylene polymer has a crystallinity of less than 30%.

In an embodiment of the invention said at least one polyethylene polymer has a crystallinity of less than 10%.

In an embodiment of the invention said at least one polyethylene polymer has a crystallinity of less than 1%.

In an embodiment of the invention said at least one polyethylene polymer is amorphous.

In an embodiment of the invention said chewing gum comprises a gum base, wherein said gum base comprises the water insoluble part of said chewing gum.

A chewing gum typically comprises a gum base, insoluble in water, which is the chewable basis for the chewing gum and typically comprises a high ratio of polymers. The remaining ingredients in the chewing gum are typically sweeteners, flavor etc. which are soluble in water, and hence may be solubilized by the saliva in the mouth of the consumer.

In an embodiment of the invention the chewing gum comprises synthetic and/or natural resin in an amount of about 5 to about 70% of said gum base.

In an embodiment of the invention the chewing gum comprises synthetic and/or natural resin in an amount of about 20 to about 55% of said gum base.

In an embodiment of the invention the chewing gum comprises synthetic and/or natural resin in an amount of about 1 to about 50% of said chewing gum.

In an embodiment of the invention the chewing gum comprises synthetic and/or natural resin in an amount of about 3 to about 25% of said chewing gum.

In an embodiment of the invention the chewing gum comprises synthetic and/or natural resin in an amount of about 5 to about 20% of said chewing gum.

In an embodiment of the invention the synthetic resin is PVA or terpene resins or any combination thereof.

In an embodiment of the invention the synthetic resin is a polyolefin.

In an embodiment of the invention the natural resin is ester gum.

In an embodiment of the invention the synthetic and/or natural resins have a molecular weight (Mn) of about 500 to about 200,000 g/mol.

In an embodiment of the invention the synthetic and/or natural resin has a molecular weight (Mn) of about 500 to about 50,000 g/mol.

In an embodiment of the invention the chewing gum comprises a mixture of synthetic and/or natural resins in a ratio between 1:20 and 20:1.

In an embodiment of the invention said chewing gum comprises said at least one further synthetic elastomer in an amount of about 1% to about 80% by weight of the elastomeric polymer content of said chewing gum.

In an embodiment of the invention said chewing gum comprises said at least one further synthetic elastomer in an amount of about 2% to about 70% by weight of the elastomeric polymer content of said chewing gum.

In an embodiment of the invention said chewing gum comprises said at least one further synthetic elastomer in an amount of about 2% to about 50% by weight of the elastomeric polymer content of said chewing gum.

In an embodiment of the invention said chewing gum comprises said at least one further synthetic elastomer in an amount of about 10% to about 85% by weight of the elastomeric polymer content of said chewing gum.

In an embodiment of the invention said chewing gum comprises said at least one further synthetic elastomer in an amount of about 20% to about 85% by weight of the elastomeric polymer content of said chewing gum.

In an embodiment of the invention the chewing gum comprises bulk sweetener in an amount from about 0.5% to about 95% of said chewing gum.

Bulk sweeteners include both sugar and sugarless components. Sugar sweeteners generally include saccharide-containing components commonly known in the chewing gum art, including but not limited to, sucrose, dextrose, maltose, dextrin, dried invert sugar, fructose, levulose, glactose, corn syrup solids, and the like, alone or in combination. Sugarless sweeteners include, but are not limited to, sugar alcohols such as sorbitol, mannitol, xylitol, hydrogenated starch hydrolysates, maltitol, and the like, alone or in combination.

In an embodiment of the invention the chewing gum comprises bulk sweetener in an amount from about 20% to about 70% of said chewing gum.

In an embodiment of the invention the chewing gum comprises bulk sweetener in an amount from about 25% to about 65% of said chewing gum.

In an embodiment of the invention the chewing gum comprises high intensity sweetener in an amount of less than 2% of said chewing gum.

High-intensity sweeteners in chewing gum typically may range from about 0.01 to 0.60 by weight percent of the total composition.

In an embodiment of the invention the chewing gum is provided with a coating.

In an embodiment of the invention the coating is selected from the group consisting of hard coating, soft coating and edible film-coating.

In an embodiment of the invention the chewing gum comprises coating in an amount of 0.1 to 95 percent by weight of a coated chewing gum piece.

In an embodiment of the invention the chewing gum comprises coating in an amount of 0.1 to 75 percent by weight of a coated chewing gum piece.

In an embodiment of the invention the chewing gum comprises one or more flavoring agents.

In some embodiments of the invention, a chewing gum may contain aroma agents and flavoring agents including natural and synthetic flavorings e.g. in the form of natural vegetable components, essential oils, essences, extracts, powders, including acids and other substances capable of affecting the taste profile. Examples of liquid and powdered flavorings include coconut, coffee, chocolate, vanilla, grape fruit, orange, lime, menthol, liquorice, caramel aroma, honey aroma, peanut, walnut, cashew, hazelnut, almonds, pineapple, strawberry, raspberry, tropical fruits, cherries, cinnamon, peppermint, wintergreen, spearmint, eucalyptus, and mint, fruit essence such as from apple, pear, peach, strawberry, apricot, raspberry, cherry, pineapple, and plum essence. The essential oils include peppermint, spearmint, menthol, eucalyptus, clove oil, bay oil, anise, thyme, cedar leaf oil, nutmeg, and oils of the fruits mentioned above.

The chewing gum flavor may be a natural flavoring agent, which is freeze-dried, preferably in the form of a powder, slices or pieces or combinations thereof. The particle size may be less than 3 mm, preferably less than 2 mm or more preferred less than 1 mm, calculated as the longest dimension of the particle. The natural flavoring agent may in a form where the particle size is from about 3 µm to 2 mm, such as from 4 µm to 1 mm. Preferred natural flavoring agents include seeds from fruit e.g. from strawberry, blackberry and raspberry.

Various synthetic flavors, such as mixed fruit flavors may also be used in the present chewing gum centers. As indicated above, the aroma agent may be used in quantities smaller than those conventionally used. The aroma agents and/or flavors may be used in the amount from 0.01 to about 30% by weight of the final product depending on the desired intensity of the aroma and/or flavor used. Preferably, the content of aroma/flavor is in the range of 0.1 to 5% by weight of the total composition.

In an embodiment of the invention the chewing gum further comprises one or more active ingredients.

According to an embodiment of the invention, applicable active ingredients may be selected among those listed in the detailed description.

In an embodiment of the invention the chewing gum comprises from about 0 to 50% by weight of the chewing gum of filler, preferably 5-20% by weight of the chewing gum.

In an embodiment of the invention the chewing gum is center-filled.

In an embodiment of the invention the chewing gum is a compressed chewing gum made by tabletting.

In an embodiment of the invention the chewing gum comprises biodegradable elastomers and resins.

In an embodiment of the invention the chewing gum comprises one or more cooling agents.

Suitable cooling agents include: substituted p-menthanes, substituted p-menthane-carboxamides (e.g., N-ethyl-p-menthane-3-carboxamide (FEMA 3455)), acyclic carboxamides, substituted cyclohexanamides, substituted cyclohexane carboxamides, substituted ureas and sulphonamides, and substituted menthanols, hydroxymethyl and hydroxyethyl derivatives of p-menthane, menthyl succinate, 2-mercapto-cyclo-decanone, 2-isopropanyl-5-methylcyclohexanol, hydroxycarboxylic acids with 2-6 carbon atoms, menthone glycerol ketals, 3-1-menthoxypropane-1,2-diol and menthyl lactate.

In an embodiment of the invention the chewing gum comprises one or more warming agents.

Physiological warming agents to be used in a chewing gum may include: vanillyl alcohol n-butyl ether, vanillyl alcohol n-propyl ether, vanillyl alcohol isopropyl ether, vanillyl alcohol isobutyl ether, vanillyl alcohol isoamyl ether, vanillyl alcohol n-hexyl ether, vanillyl alcohol methyl ether, vanillyl alcohol ethyl ether, vanillyl alcohol n-amino ether, gingerol, zingerone, capsaicin, shogaol, paradol, dihydrocapsaicin, nordihydrocapsaicin, homocapsaicin, homodihydrocapsaicin, ethanol, iso-propyl alcohol, iso-amylalcohol, benzyl alcohol, chloroform, eugenol, cinnamon oil, cinnamic aldehyde, and phosphate derivatives thereof. The phosphate derivatives are described and can be found in WO 97/02273, hereby incorporated by reference.

In an embodiment of the invention the chewing gum is granulated.

In an embodiment of the invention the chewing gum is in powder form.

In an embodiment of the invention the gum base comprises filler.

In an embodiment of the invention the gum base is granulated.

Granulated gum base may e.g. be used for tabletting, e.g. when mixed with further chewing gum ingredients such as sweeteners and further ingredients typically added to gum base in order to obtained the final chewing gum. The gum base granules have advantageous texture and processing properties.

In an embodiment of the invention the gum base is in powder form.

Moreover the invention relates to the use of polyethylene in a chewing gum according to any of the claims 1-56.

Moreover the invention relates to the use of polyethylene as an elastomer in a chewing gum according to any of the claims 1-56.

Moreover the invention relates to the method of manufacturing chewing gum granules for tabletting, the method comprising the steps of providing a chewing gum substance according to any of the claims 1-56 and granulating the substance into chewing gum granules.

Although the chewing gum substance according to the invention is very suitable for processing and in particular very suitable for granulation, the granulation may advantageously be performed on a chewing substance which has been cooled to less than +10° C., preferably less than 0° C.

Moreover the invention relates to the method of manufacturing a chewing gum wherein the chewing gum is formed by a tabletting process on the basis of chewing gum granules and wherein the chewing gum granules comprise chewing gum according to any of the claims 1-56.

Moreover the invention relates to the method of manufacturing a chewing gum wherein the chewing gum is formed by a tabletting process on the basis of chewing gum in powder form and wherein the chewing gum in powder form comprises chewing gum according to any of the claims 1-56.

In general, a chewing gum composition typically comprises a water-soluble bulk portion, a water-insoluble chewable gum base portion and flavoring agents. The water-soluble portion dissipates with a portion of the flavoring agent over a period of time during chewing. The gum base portion is retained in the mouth throughout the chew. The term "chewing gum" refers to both a chewing and bubble type gum in its general sense.

Unless otherwise indicated, as used herein with regard to polymers, the term "molecular weight" means weight average molecular weight (Mw) in g/mol. Furthermore, as used herein the short form PD designates the polydispersity of polymers, polydispersity being defined as Mw/Mn, where Mn is the number average molecular weight of a polymer. A well-established technique for characterization of biodegradable polymers is gel permeation chromatography (GPC).

The gum base is the masticatory substance of the chewing gum, which imparts the chew characteristics to the final product. The gum base typically defines the release profile of flavors and sweeteners and plays a significant role in the gum product.

The insoluble portion of the gum typically may contain any combination of elastomers, elastomer plasticizers, waxes, softeners, fillers and other optional ingredients such as colorants and antioxidants. An elastomer plasticizer may also generally be referred to as a resin or as a resinous compound.

The composition of gum base formulations can vary substantially depending on the particular product to be prepared and on the desired masticatory and other sensory characteristics of the final product.

A gum base formulation may e.g. comprise from 1 to 80% elastomeric compounds, 2 to 85% elastomer plasticizers, 0 to 60% waxes, 5 to 65% softeners including emulsifiers, 0 to 70% fillers, and 0 to 35% miscellaneous ingredients such as antioxidants, colorants, etc. However, typical ranges (% by weight of the gum base) of the above gum base components are: 1 to 5.0% elastomeric compounds, 5 to 55% elastomer plasticizers, 0 to 40% waxes, 5 to 35% softeners, 0 to 50% fillers, and 0 to 5% miscellaneous ingredients such as antioxidants, colorants, etc. The gum base may comprise about 5 to about 95 percent, by weight, of the chewing gum, more commonly; the gum base comprises 10 to about 60 percent of the gum. Elastomers provide the rubbery, cohesive nature to the gum, which varies depending on these ingredients' chemical structure and how it may be compounded with other ingredients. Elastomers suitable for use in some embodiments of gum bases and chewing gums may include natural or synthetic types.

According to the invention, polyethylene may in fact be applied as a significant elastomer in chewing gum when combined with one or more other synthetic elastomer(s).

Polyethylene is created through polymerization of ethylene, and is typically classified according to the density of the polymers. Preferred classes to be used according to the present invention is LDPE (low density PE), MDPE (medium density PE), VLDPE (very low density PE) and LLDPE (linear low density PE, which is actually a copolymer primarily made of ethylene monomers and with a small fraction of short chain alpha-olefines such as for example 1-butene, 1-hexene etc). These classes have densities for polyethylenes lying in the range of about 0.880 g/cm$^3$ to about 0.940 g/cm$^3$.

Additional elastomers besides PE may be any water-insoluble polymer known in the art, and includes those polymers utilized for chewing gum and bubble gum listed in U.S. Food and Drug Administration, CFR, Title 21, Section 172,615, as "Masticatory Substances of Natural Vegetable Origin" and "Masticatory Substances, Synthetic", the contents of which are incorporated herein by reference for all purposes.

Useful natural elastomers include natural rubber such as smoked or liquid latex and guayule, natural gums such as jelutong, lechi caspi, perillo, sorva, massaranduba balata, massaranduba chocolate, nispero, rosidinha, chicle, gutta percha, gutta kataiu, niger gutta, tunu, chilte, chiquibul, gutta hang kang.

Useful synthetic elastomers include high molecular weight elastomers such as butadiene-styrene copolymers, polyisoprene, polyisobutylene and isobutylene-isoprene copolymers, low molecular weight elastomers such as polybutene, polybutadiene and polyisobutylene, vinyl polymeric elastomers such as PVA, polyethylene, vinyl copolymeric elastomers such as vinyl acetate/vinyl laurate, vinyl acetate/vinyl stearate, ethylene/vinyl acetate, polyvinyl alcohol or mixtures thereof.

Butadiene-styrene type elastomers (SBR) typically are copolymers of from about 20:80 to 60:40 styrene:butadiene monomers. The ratio of these monomers affects the elasticity of the SBR as evaluated by mooney viscosity. As the styrene:butadiene ratio decreases, the mooney viscosity decreases.

The structure of SBR typically consists of straight chain 1,3-butadiene copolymerized with phenylethylene (styrene) and provides the non-linear molecular nature of these elastomers. The average molecular weight of SBR is <600,000 g/mol.

Isobutylene-isoprene type elastomers (butyl rubber) have molar percent levels of isoprene ranging from 0,2 to 4,0. Similar to SBR, as the isoprene:isobutylene ratio decreases, so does the elasticity, measured by mooney viscosity.

The structure of butyl rubber typically consists of branched 2-methyl-1,3-butadiene (isoprene) copolymerized with branched 2-methylpropene (isobutylene), and, as with SBR, this type of structure is non-linear in nature. The average molecular weight of butyl rubber is in the range from 150,000 g/mole to 1,000,000 g/mole.

Polyisobutylene (PIB) as with SBR and butyl, is also non-linear in nature. The low molecular weight elastomers provide soft chew characteristics to the polymer system and still provide the elastic qualities as do the other elastomers. Average molecular weights may range from about 30,000 to 120,000 g/mole and the penetration may range from about 4 millimeters to 20 millimeters. The higher the penetration, the softer the PIB. Similar to the SBR and butyl, the high molecular weight elastomers provide elasticity of the gum. Average molecular weight may range from 120,000 to 1,000,000 g/mole.

Vinyl copolymeric types of polymers may also be applied as a supplementary polymer of the gum base. For vinyl copolymeric types, the amount of vinyl laurate, vinyl stearate, or ethylene present in the vinyl laurate/vinyl acetate (VL/VA), vinyl stearate/vinyl acetate (VS/VA), or ethylene/vinyl acetate (EVA) copolymers respectively typically ranges from about 10 to about 60 percent by weight of the copolymer. Average molecular weights of these polymers may range from about 2,000 g/mole to about 100,000 g/mole.

The vinyl polymers as polyvinyl alcohol and PVA may have an average molecular weight from about 8,000 g/mole to about 65,000 g/mole.

Elastomer plasticizers vary the firmness of the gum base. Their specificity on elastomer inter-molecular chain breaking (plasticizing) along with their varying softening points cause varying degrees of finished gum firmness and compatibility when used in base. This may be important when one wants to provide more elastomeric chain exposure to the alkanic chains of the waxes.

In some embodiments, further polymeric or non-polymeric plasticizers may be applied such as triacetin, acetylated mono- and di- and triglycerides of short chain fatty acids, acetylated mono- and di- and triglycerides of medium chain fatty acids, acetylated monoglycerides of long chain fatty acids, glycerol ester of rosin and low molecular weight PVA. The two latter may also be referred to as a natural and synthetic resin, respectively, within the art.

The elastomer plasticizers used may be of one type or of combinations of more than one type. Typically, the ratios of one to the other are dependent on each respective softening point, the effect on flavor release, and the respective degree of tack they cause to the gum. The above mentioned elastomer plasticizers may also be referred to as conventional resins in the following description.

Examples of such synthetic resins include PVA, vinyl acetate-vinyl laurate copolymers and mixtures thereof. Examples of synthetic elastomers include, but are not limited to, synthetic elastomers listed in U.S. Food and Drug Administration, CFR, Title 21, Section 172,615, the contents of which are incorporated herein by reference for all purposes.

Examples of natural resins are: Natural rosin esters, often referred to as ester gums including as examples glycerol esters of partially hydrogenated rosins, glycerol esters of polymerized rosins, glycerol esters of partially dimerised rosins, glycerol esters of tally oil rosins, pentaerythritol esters of partially hydrogenated rosins, methyl esters of rosins, partially hydrogenated methyl esters of rosins, pentaerythritol esters of rosins, synthetic resins such as terpene resins derived from alpha-pinene, beta-pinene, and/or d-limonene, and natural terpene resins.

It is common in the industry to combine in a gum base a synthetic elastomer having a high molecular weight and a synthetic elastomer having a low molecular weight. Examples of such combinations of are polyisobutylene and styrene-butadiene, polyisobutylene and polyisoprene, polyisobutylene and isobutylene-isoprene co-polymer (butyl rubber) and a combination of polyisobutylene, styrene-butadiene copolymer and isobutylene isoprene copolymer, and all of the above individual synthetic polymers in admixture with PVA, vinyl acetate-vinyl laurate copolymers, respectively and mixtures thereof.

In accordance with the general principles in manufacturing a chewing gum within the scope of the invention, variations of different suitable ingredients are listed and explained below.

In some embodiments the chewing gum may comprise coloring agents. According to an embodiment of the invention, the chewing gum may comprise color agents and whiteners such as FD&C-type dyes and lakes, fruit and vegetable extracts, titanium dioxide and combinations thereof.

Further useful chewing gum base components include antioxidants, e.g. butylated hydroxytoluene (BHT), butyl hydroxyanisol (BHA), propylgallate and tocopherols, and preservatives.

In an embodiment of the invention, the chewing gum comprises softeners in an amount of about 0 to about 18% by weight of the chewing gum, more typically about 0 to about 12% by weight of the chewing gum.

Waxes may be optional depending on the properties of the individual formulations. Petroleum waxes aid in the curing of the finished chewing gum as well as improve shelf-life and texture. Wax crystal size influences the release of flavor. Those waxes high in iso-alkanes have a smaller crystal size than those waxes high in normal-alkanes, especially those with normal-alkanes of carbon numbers less than 30. The smaller crystal size allows slower release of flavor since there is more hindrance of the flavor's escape from this wax versus a wax having larger crystal sizes. The compatibility of polymer systems made using normal-alkanic waxes is less when compared to polymer systems made with iso-alkanic waxes.

Waxes and fats may moreover be used for the adjustment of the consistency and for softening of the chewing gum base when preparing chewing gum bases.

Petroleum wax (refined paraffin and microcrystalline wax) and paraffin wax is composed of mainly straight-chained normal-alkanes and branched iso-alkanes. The ratio of normal-alkanes to iso-alkanes varies.

The normal-alkanic waxes typically have carbon chain lengths >C-18 but the lengths are not predominantly longer than C-30. The branched and ring structures are located near the end of the chain for those waxes that are predominantly normal-alkanic. The viscosity of normal-alkanic waxes is <10 mm2/s (at 100° C.) and the combined number average molecular weight is <600 g/mole.

The iso-alkanic waxes typically have carbon lengths that are predominantly greater than C-30. The branched chains and ring structures are located randomly along the carbon chain in those waxes that are predominantly iso-alkanic. The viscosity of iso-alkanic waxes is greater than 10 mm2/s (at 100° C.) and the combined number average molecular weight is >600 g/mole.

Synthetic waxes are produced by means atypical of petroleum wax production and thus are not considered petroleum wax. The synthetic waxes may include waxes containing branched alkanes and copolymerized with monomers such as but not limited to propylene and polyethylene and Fischer Tropsch type waxes. Polyethylene wax is a synthetic wax containing alkane units of varying lengths having attached thereto ethylene monomers.

The natural waxes may include rice bran wax, bees' wax, carnauba wax or candelilla wax.

In some embodiments, any conventionally used and suitable type of wax and fat may be used, such as for instance rice bran wax, polyethylene wax, petroleum wax (refined paraffin and microcrystalline wax), paraffin, beeswax, carnauba wax, candelilla wax, cocoa butter, degreased cocoa powder and any suitable oil or fat, as e.g. completely or partially hydrogenated vegetable oils or completely or partially hydrogenated animal fats.

Softeners/emulsifiers may in some embodiments be added both in the chewing gum and the gum base.

The selection of softeners has an influence on the softness of the base. Softeners modify the texture, cause the hydrophobic and hydrophilic components of the base to be miscible, and may further plasticize the synthetic polymers of the polymer system. The emulsifiers, which belong to the group of softeners, provide the polymer system with water-binding properties, which confer to the polymer system a pleasant smooth surface and reduce its adhesive properties.

Softeners suitable for use in the polymer system include triglycerides of non-hydrogenated, partially hydrogenated and fully hydrogenated vegetable oils and tallow, cocoa butter and degreased cocoa powder and in addition to these the emulsifiers.

The group of triglycerides includes cottonseed, palm, palm kernel, coconut, safflower, rapeseed, sunflower, tallow, soybean, cocoa butter, medium chained triglycerides and the like.

The caproic, caprylic, capric, myristic, lauric and palmitic fatty acids of the triglycerides tend to plasticize the synthetic elastomers more than triglycerides containing predominantly stearic fatty acid.

To the group of emulsifiers belong the monoglycerides, diglycerides, acetylated mono and diglycerides, distilled mono- and diglycerides, glycerol monostearate, propylene glycol monostearate, Na-, K-, Mg- and Ca-stearates, glycerol triacetate, fatty acid monoglycerides (e.g. stearic, palmitic, oleic and linoleic acids), lactic acid esters and acetic acid esters of mono- and diglycerides, sugar esters of edible fatty acids also referred to as sucrose polyesters including those disclosed in WO 00/25598 hereby included by reference, lecithin and hydroxylated lecithin, most of these may contain triglyceride levels less than 2 percent by weight from their manufacturing processing.

The softeners including the emulsifiers may be used alone or at least two or more in combination.

Fillers used in polymer system modify the texture of the polymer system and aid in processing. Particle size has an effect on cohesiveness, density and processing characteristics of the polymer system and its compounding. The smaller the particle size, the more dense and cohesive the final polymer system. Also, by selecting fillers based on their particle size distribution, initial mass compounding may be varied, thus allowing alteration of the compounding characteristics of the initial mass during polymer system processing and ultimately the final chew characteristics of gums made from these polymer systems.

Fillers suitable for use in the polymer system include magnesium and calcium carbonate, ground limestone and silicate types such as magnesium and aluminum silicate, kaolin and clay, aluminum oxide, silicon oxide, talc, as well as titanium oxide, mono-, di- and tricalcium phosphate, sodium sulphate, cellulose polymers such as ethyl, methyl and wood or mixtures thereof.

Talc filler may be used in embodiments of gum bases and chewing gums that may come in contact with or employ acid flavors or provide an acidic environment needed to prevent degradation of an artificial sweetener by reacting with calcium carbonate type fillers. Mean particle size for calcium carbonate and talc fillers typically range from about 0.1 micron to about 15 microns.

The fillers may also include natural organic fibers such as fruit vegetable fibers, grain, rice, cellulose and combinations thereof.

In an embodiment of the invention, the chewing gum comprises filler in an amount of about 0 to about 50% by weight of the chewing gum, more typically about 5 to about 20% by weight of the chewing gum.

In addition to a, typically, water insoluble gum base portion, a typical chewing gum according to the invention includes a water soluble bulk portion and one or more flavoring agents. The water-soluble portion may include bulk sweeteners, high intensity sweeteners, flavoring agents, softeners, emulsifiers, colors, acidulants, fillers, antioxidants, and other components that provide desired attributes.

Suitable bulk sweeteners include both sugar and non-sugar sweetening components. Bulk sweeteners typically constitute from about 5 to about 95% by weight of the chewing gum, more typically about 20 to about 80% by weight such as 30 to 60% by weight of the gum.

Useful sugar sweeteners are saccharide-containing components commonly known in the chewing gum art including, but not limited to, sucrose, dextrose, maltose, dextrins, trehalose, D-tagatose, dried invert sugar, fructose, levulose, galactose, corn syrup solids, and the like, alone or in combination.

Sorbitol can be used as a non-sugar sweetener. Other useful non-sugar sweeteners include, but are not limited to, other sugar alcohols such as mannitol, xylitol, hydrogenated starch hydrolysates, maltitol, isomalt, erythritol, lactitol and the like, alone or in combination.

High-intensity artificial sweetening agents can also be used alone or in combination with the above sweeteners. Preferred high-intensity sweeteners include, but are not limited to sucralose, aspartame, salts of acesulfame, alitame, neotame, twinsweet, saccharin and its salts, cyclamic acid and its salts, glycyrrhizin, dihydrochalcones, thaumatin, monellin, stevioside and the like, alone or in combination. In order to provide longer lasting sweetness and flavor perception, it may be desirable to encapsulate or otherwise control the release of at least a portion of the artificial sweetener. Techniques such as wet granulation, wax granulation, spray drying, spray chilling, fluid bed coating, coascervation, encapsulation in yeast cells and fiber extrusion may be used to achieve the desired release characteristics. Encapsulation of sweetening agents can also be provided using another chewing gum component such as a resinous compound.

Usage level of the high intensity artificial sweetener will vary considerably and will depend on factors such as potency of the sweetener, rate of release, desired sweetness of the product, level and type of flavor used and cost considerations. Thus, the active level of high potency artificial sweetener may vary from about 0 to about 8% by weight, preferably 0.001 to about 5% by weight. When carriers used for encapsulation are included, the usage level of the encapsulated sweetener will be proportionately higher.

Combinations of sugar and/or non-sugar sweeteners can be used in the chewing gum formulation processed in accordance with the invention. Additionally, the softener may also provide additional sweetness such as aqueous sugar or alditol solutions.

If a low-calorie gum is desired, a low-caloric bulking agent can be used. Examples of low caloric bulking agents include polydextrose, Raftilose, Raftilin, fructooligosaccharides (NutraFlora®), palatinose oligosaccharides; guar gum hydrolysates (e.g. Sun Fiber®) or indigestible dextrins (e.g. Fibersol®). However, other low-calorie bulking agents can be used.

In some embodiments, a chewing gum may contain aroma agents and flavoring agents including natural and synthetic flavorings e.g. in the form of natural vegetable components, essential oils, essences, extracts, powders, including acids and other substances capable of affecting the taste profile. Examples of liquid and powdered flavorings include coconut, coffee, chocolate, vanilla, grape fruit, orange, lime, menthol, liquorice, caramel aroma, honey aroma, peanut, walnut, cashew, hazelnut, almonds, pineapple, strawberry, raspberry, tropical fruits, cherries, cinnamon, peppermint, wintergreen, spearmint, eucalyptus, and mint, fruit essence such as from apple, pear, peach, strawberry, apricot, raspberry, cherry, pineapple, and plum essence. The essential oils include peppermint, spearmint, menthol, eucalyptus, clove oil, bay oil, anise, thyme, cedar leaf oil, nutmeg, and oils of the fruits mentioned above.

The chewing gum flavor may be a natural flavoring agent, which is freeze-dried, preferably in the form of a powder, slices or pieces or combinations thereof. The particle size may be less than 3 mm, less than 2 mm or more preferred less than 1 mm, calculated as the longest dimension of the particle. The natural flavoring agent may in a form where the particle size is from about 3 µm to 2 mm, such as from 4 µm to 1 mm. Preferred natural flavoring agents include seeds from fruit e.g. from strawberry, blackberry and raspberry.

Various synthetic flavors, such as mixed fruit flavors may also be used in the present chewing gum centers. As indicated above, the aroma agent may be used in quantities smaller than those conventionally used. The aroma agents and/or flavors may be used in the amount from 0.01 to about 30% by weight of the final product depending on the desired intensity of the aroma and/or flavor used. Preferably, the content of aroma/flavor is in the range of 0.2 to 3% by weight of the total composition.

In an embodiment of the invention, the flavoring agents comprise natural and synthetic flavorings in the form of natural vegetable components, essential oils, essences, extracts, powders, including acids and other substances capable of affecting the taste profile.

Further chewing gum ingredients, which may be included in some embodiments, include surfactants and/or solubilizers, especially when pharmaceutically or biologically active ingredients are present. As examples of types of surfactants to be used as solubilizers in a chewing gum composition according to an embodiment of the invention, reference is made to H. P. Fiedler, Lexikon der Hilfsstoffe für Pharmacie, Kosmetik und Angrenzende Gebiete, pages 63-64 (1981) and the lists of approved food emulsifiers of the individual countries. Anionic, cationic, amphoteric or non-ionic solubilizers can be used. Suitable solubilizers include lecithin, polyoxyethylene stearate, polyoxyethylene sorbitan fatty acid esters, fatty acid salts, mono and diacetyl tartaric acid esters of mono and diglycerides of edible fatty acids, citric acid esters of mono and diglycerides of edible fatty acids, saccharose esters of fatty acids, polyglycerol esters of fatty acids, polyglycerol esters of interesterified castor oil acid (E476), sodium stearoyllatylate, sodium lauryl sulfate and sorbitan esters of fatty acids and polyoxyethylated hydrogenated castor oil (e.g. the product sold under the trade name CREMOPHOR), block copolymers of ethylene oxide and propylene oxide (e.g. products sold under trade names PLURONIC and POLOXAMER), polyoxyethylene fatty alcohol ethers, polyoxyethylene sorbitan fatty acid esters, sorbitan esters of fatty acids and polyoxyethylene steraric acid esters.

Particularly suitable solubilizers are polyoxyethylene stearates, such as for instance polyoxyethylene(8)stearate and polyoxyethylene(40)stearate, the polyoxyethylene sorbitan fatty acid esters sold under the trade name TWEEN, for instance TWEEN 20 (monolaurate), TWEEN 80 (monooleate), TWEEN 40 (monopalmitate), TWEEN 60 (monostearate) or TWEEN 65 (tristearate), mono and diacetyl tartaric acid esters of mono and diglycerides of edible fatty acids, citric acid esters of mono and diglycerides of edible fatty acids, sodium stearoyllatylate, sodium laurylsulfate, polyoxyethylated hydrogenated castor oil, blockcopolymers of ethylene oxide and propyleneoxide and polyoxyethylene fatty alcohol ether. The solubilizer may either be a single compound or a combination of several compounds. In the presence of an active ingredient, the chewing gum may preferably also comprise a carrier known in the art.

Emulsifiers, which are used as softeners may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

According to an embodiment of the invention, the chewing gum may comprise a pharmaceutically, cosmetically or biologically active substance. Examples of such active substances, a comprehensive list of which is found e.g. in WO 00/25598, which is incorporated herein by reference.

The active agents to be used in some embodiments may be any substance desired to be released from the chewing gum. If an accelerated rate of release is desired, corresponding to the effect obtained for the flavor, the primary substances are those with limited water solubility, typically below 10 g/100 ml including substances which are entirely water insoluble. Examples are medicines, dietary supplements, oral compositions, anti-smoking agents, highly potent sweeteners, pH adjusting agents, etc.

Further examples of active ingredients include paracetamol, benzocaine, cinnarizine, menthol, carvone, caffeine, chlorhexidine-di-acetate, cyclizine hydrochloride, 1,8-cineol, nandrolone, miconazole, mystatine, aspartame, sodium fluoride, nicotine, saccharin, cetylpyridinium chloride, other quaternary ammonium compounds, vitamin E, vitamin A, vitamin D, glibenclamide or derivatives thereof, progesterone, acetylsalicylic acid, dimenhydrinate, cyclizine, metronidazole, sodium hydrogencarbonate, the active components from ginkgo, the active components from propolis, the active components from ginseng, methadone, oil of peppermint, salicylamide, hydrocortisone or astemizole.

Examples of active agents in the form of dietary supplements are for instance salts and compounds having the nutritive effect of vitamin B2 (riboflavin), B12, folic acid, niacine, biotine, poorly soluble glycerophosphates, amino acids, the vitamins A, D, E and K, minerals in the form of salts, complexes and compounds containing calcium, phosphorus, magnesium, iron, zinc, copper, iodine, manganese, chromium, selenium, molybdenum, potassium, sodium or cobalt.

Furthermore, reference is made to lists of nutrients accepted by the authorities in different countries such as for instance U.S. code of Federal Regulations, Title 21, Section 182.5013.182 5997 and 182.8013-182.8997, the contents of which are incorporated herein by reference for all purposes.

Examples of active agents in the form of compounds for the care or treatment of the oral cavity and the teeth, are for instance bound hydrogen peroxide and compounds capable of releasing urea during chewing.

Examples of active agents in the form of antiseptics are for instance salts and compounds of guanidine and biguanidine (for instance chlorhexidine diacetate) and the following types of substances with limited water-solubility: quaternary ammonium compounds (for instance ceramine, chloroxylenol, crystal violet, chloramine), aldehydes (for instance paraformaldehyde), compounds of dequaline, polynoxyline, phenols (for instance thyrol, para chlorophenol, cresol) hexachlorophene, salicylic anilide compounds, triclosan, halogenes (iodine, iodophores, chloroamine, dichlorocyanuric acid salts), alcools (3,4 dichlorobenzyl alcohol, benzyl alcohol, phenoxyethanol, phenylethanol), cf. furthermore Martindale, The Extra Pharmacopoeia, 28th edition, page 547-578; metal salts, complexes and compounds with limited water-solubility, such as aluminum salts, (for instance aluminum potassium sulfate AlK $(SO_4)$ 2, $12H_2O$) and furthermore salts, complexes and compounds of boron, barium, strontium, iron, calcium, zinc, (zinc acetate, zinc chloride, zinc gluconate), copper (copper chloride, copper sulfate), lead, silver, magnesium, sodium, potassium, lithium, molybdenum, vanadium should be included; other compositions for the care of mouth and teeth: for instance; salts, complexes and compounds containing fluorine (such as sodium fluoride, sodiummonofluorophosphate, aminofluorides, stannous fluoride), phosphates, carbonates and selenium.

For additional compounds, see J. Dent. Res. Vol. 28 No. 2, page 160-171, 1949, wherein a wide range of tested compounds are mentioned, the contents of which are incorporated herein by reference for all purposes.

Examples of active agents in the form of agents adjusting the pH in the oral cavity include for instance: acceptable acids, such as adipinic acid, succinic acid, fumaric acid, or salts thereof or salts of citric acid, tartaric acid, malic acid, acetic acid, lactic acid, phosphoric acid and glutaric acid and acceptable bases, such as carbonates, hydrogen carbonates, phosphates, sulfates or oxides of sodium, potassium, ammonium, magnesium or calcium, especially magnesium and calcium.

Examples of active agents in the form of anti-smoking agents include for instance: nicotine, tobacco powder or silver salts, for instance silver acetate, silver carbonate and silver nitrate.

Further examples of active agents are medicines of any type.

Examples of active agents in the form of medicines include caffeine, salicylic acid, salicyl amide and related substances (acetylsalicylic acid, choline salicylate, magnesium salicylate, sodium salicylate), paracetamol, salts of pentazocine (pentazocine hydrochloride and pentazocinelactate), buprenorphine hydrochloride, codeine hydrochloride and codeine phosphate, morphine and morphine salts (hydrochloride, sulfate, tartrate), methadone hydrochloride, ketobemidone and salts of ketobemidone (hydrochloride), beta-blockers, (propranolol), calcium antagonists, verapamil hydrochloride, nifedinpine as well as suitable substances and salts thereof mentioned in Pharm. Int., November 85, pages 267-271, Barney H. Hunter and Robert L. Talbert, nitroglycerine, erythrityl tetranitrate, strychnine and salts thereof, lidocaine, tetracaine hydrochloride, etorphine hydrochloride, atropine, insulin, enzymes (for instance papain, trypsin, amyloglucosidase. glucoseoxidase, streptokinase, streptodomase, dextranase, alpha amylase), polypeptides (oxytocin, gonadorelin, (LH. RH), desmopressin acetate (DDAVP), isoxsuprine hydrochloride, ergotamine compounds, chloroquine (phosphate, sulfate), isosorbide, demoxytocin, heparin.

Other active ingredients include beta-lupeol, Letigen, Sildenafil citrate and derivatives thereof.

Dental products include Carbami, CPP Caseine Phospho Peptide; Chlorhexidine, Chlorhexidine di acetate, Chlorhexidine Chloride, Chlorhexidine di gluconate, Hexetedine, Strontium chloride, Potassium Chloride, Sodium bicarbonate, Sodium carbonate, Fluor containing ingredients, Fluorides, Sodium fluoride, Aluminum fluoride, Ammonium fluoride, Calcium fluoride, Stannous fluoride, Other fluor containing ingredients Ammonium fluorosilicate, Potassium fluorosilicate, Sodium fluorosilicate, Ammonium monofluorphosphate, Calcium monofluorphosphate, Potassium monofluorphosphate, Sodium monofluorphosphate, Octadecentyl Ammonium fluoride, Stearyl Trihydroxyethyl Propylenediamine Dihydrofluoride, Vitamins include A, B1, B2, B6, B12, Folin acid, niacin, Pantothene acid, biotine, C, D, E, K.

Minerals include Calcium, phosphor, magnesium, iron, Zink, Cupper, lod, Mangan, Crom, Selene, Molybden. Other active ingredients include: Q10@, enzymes. Natural drugs including Ginkgo Biloba, ginger, and fish oil. The invention also relates to use of migraine drugs such as Serotonin antagonists: Sumatriptan, Zolmitriptan, Naratriptan, Rizatriptan, Eletriptan; nausea drugs such as Cyclizin, Cinnarizin, Dimenhydramin, Difenhydrinat; hay fever drugs such as Cetrizin, Loratidin, pain relief drugs such as Buprenorfin, Tramadol, oral disease drugs such as Miconazol, Amphotericin B, Triamcinolonaceton; and the drugs Cisaprid, Domperidon, Metoclopramid.

Active ingredients may comprise the below-mentioned compounds or derivates thereof but are not limited thereto: Acetaminophen, Acetylsalicylic acid Buprenorphine Bromhexin Celcoxib Codeine, Diphenhydramin, Diclofenac, Etoricoxib, Ibuprofen, Indometacin, Ketoprofen, Lumiracoxib, Morphine, Naproxen, Oxycodon, Parecoxib, Piroxicam, Pseudoefedrin, Rofecoxib, Tenoxicam, Tramadol, Valdecoxib, Calciumcarbonat, Magaldrate, Disulfiram, Bupropion, Nicotine, Azithromycin, Clarithromycin, Clotrimazole, Erythromycin, Tetracycline, Granisetron, Ondansetron, Prometazin, Tropisetron, Brompheniramine, Ceterizin, leco-Ceterizin, Chlorcyclizine, Chlorpheniramin, Chlorpheniramin, Difenhydramine, Doxylamine, Fenofenadin, Guaifenesin, Loratidin, des-Loratidin, Phenyltoloxamine, Promethazin, Pyridamine, Terfenadin, Troxerutin, Methyldopa, Methylphenidate, Benzalcon. Chloride, Benzeth. Chloride, Cetylpyrid. Chloride, Chlorhexidine, Ecabet-sodium, Haloperidol, Allopurinol, Colchinine, Theophylline, Propanolol, Prednisolone, Prednisone, Fluoride, Urea, Miconazole, Actot, Glibenclamide, Glipizide, Metformin, Miglitol, Repaglinide, Rosiglitazone, Apomorfin, Cialis, Sildenafil, Vardenafil, Diphenoxylate, Simethicone, Cimetidine, Famotidine, Ranitidine, Ratinidine, cetrizin, Loratadine, Aspirin, Benzocaine, Dextrometorphan, Ephedrine, Phenylpropanolamine, Pseudoephedrine, Cisapride, Domperidone, Metoclopramide, Acyclovir, Dioctylsulfosucc., Phenolphtalein, Almotriptan, Eletriptan, Ergotamine, Migea, Naratriptan, Rizatriptan, Sumatriptan, Zolmitriptan, Aluminum salts, Calcium salts, Ferro salts, Silver salts, Zinc-salts, Amphotericin B, Chlorhexidine, Miconazole, Triamcinolonacetonid, Melatonine, Phenobarbitol, Caffeine, Benzodiazepiner, Hydroxyzine, Meprobamate, Phenothiazine, Buclizine, Brometazine, Cinnarizine, Cyclizine, Difenhydramine, Dimenhydrinate, Buflomedil, Amphetamine, Caffeine, Ephedrine, Orlistat, Phenylephedrine, Phenylpropanolamin, Pseudoephedrine, Sibutramin, Ketoconazole, Nitroglycerin, Nystatin, Progesterone, Testosterone, Vitamin B12, Vitamin C, Vitamin A, Vitamin D, Vitamin E, Pilocarpin, Aluminumaminoacetat, Cimetidine, Esomeprazole, Famotidine, Lansoprazole, Magnesiumoxide, Nizatide and or Ratinidine.

In an embodiment of the invention, the flavor may be used as taste masking in chewing gum comprising active ingredients, which by themselves have undesired taste or which alter the taste of the formulation.

The chewing gum may optionally contain usual additives, such as binding agents, acidulants, fillers, coloring agents, preservatives, and antioxidants.

Materials to be used for the above-mentioned encapsulation methods for sweeteners might e.g. include Gelatine, Wheat protein, Soya protein, Sodium caseinate, Caseine, Gum arabic, Mod. starch, Hydrolyzed starches (maltodextrines), Alginates, Pectin, Carregeenan, Xanthan gum, Locus bean gum, Chitosan, Bees wax, Candelilla wax, Carnauba wax, Hydrogenated vegetable oils, Zein and/or Sucrose.

In general, chewing gum may be manufactured by sequentially adding the various chewing gum ingredients to a commercially available mixer known in the art.

A mixing of chewing gum and gum base may generally be performed by a batch or a continuous processing technique. An example of basic applicable mixing principles is explained below.

After the initial ingredients have been thoroughly mixed, the chewing gum mass is discharged from the mixer and shaped into the desired form such as by rolling into sheets and cutting into sticks, extruded into chunks or casting into pellets.

Generally, the ingredients may be added and mixed in the running mixer. Colors, active agents and/or emulsifiers may also be added at this time. A softener such as glycerin may also be added at this time, along with syrup and a portion of the bulking agent/sweetener. Further portions of the bulking agent/sweetener may then be added to the mixer. A flavoring agent is typically added with the final portion of the bulking agent/sweetener. A high-intensity sweetener is preferably added after the final portion of bulking agent and flavor has been added.

The entire mixing procedure typically takes from five to fifteen min, but longer mixing times may sometimes be required. Those skilled in the art will recognize that many variations of the above described procedure may be followed. Including the one-step method described in US patent application 2004/0115305 hereby incorporated by reference.

The final chewing gums are formed by extrusion, compression, rolling and may be centre filled with liquids and/or solids in any form.

In some embodiments the chewing gum may be formed as conventional pellets, centre filled, slabs, sticks, tape, beads, powders, etc.

A centre filled chewing gum may e.g. be made according to U.S. Pat. No. 4,683,138, hereby incorporated by reference.

In some embodiments the chewing gum may also be provided with an outer coating, which may be a hard coating, a soft coating, a film coating, or a coating of any type that is known in the art, or a combination of such coatings. The coating may typically constitute 0.1 to 75 percent by weight of a coated chewing gum piece.

One preferred outer coating type is a hard coating, which term is including sugar coatings and sugar-free (or sugarless) coatings and combinations thereof. The object of hard coating is to obtain a sweet, crunchy layer, which is appreciated by the consumer and to protect the gum centers. In a typical process of providing the chewing gum centers with a protective sugar coating the gum centers are successively treated in suitable coating equipment with aqueous solutions of crystallizable sugar such as sucrose or dextrose, which, depending on the stage of coating reached, may contain other functional ingredients, e.g. fillers, colors, etc.

In one presently preferred embodiment, the coating agent applied in a hard coating process is a sugarless coating agent, e.g. a polyol including as examples sorbitol, maltitol, mannitol, xylitol, erythritol, lactitol and isomalt or e.g. a mono-di-saccharide including as example trehalose.

Or alternatively a sugar free soft coating e.g. comprising alternately applying to the centres a syrup of a polyol or a mono-di-saccharide, including as examples sorbitol, maltitol, mannitol, xylitol, erythritol, lactitol, isomalt and trehalose.

In further useful embodiments a film coating is provided by film-forming agents such as a cellulose derivative, a modified starch, a dextrin, gelatine, zein, shellec, gum arabic, a vegetable gum, a synthetic polymer, etc. or a combination thereof.

In an embodiment of the invention, the outer coating comprises at least one additive component selected from the group comprising of a binding agent, a moisture-absorbing component, a film-forming agent, a dispersing agent, an antisticking component, a bulking agent, a flavoring agent, a coloring agent, a pharmaceutically or cosmetically active component, a lipid component, a wax component, a sugar, an acid.

A coated chewing gum center according to the invention may have any form, shape or dimension that permits the chewing gum center to be coated using any conventional coating process.

In some embodiments the gum centre of coated chewing gum elements can have any form, shape or dimension that permits the chewing gum centre to be coated using any conventional coating process. Accordingly, the gum centre may be e.g. in a form selected from a pellet, a cushion-shaped pellet, a stick, a tablet, a chunk, a pastille, a pill, a ball and a sphere, and typically the weight of a gum center may be 0.2 to 8 grams, preferably between 0.5 to 5 grams.

The following non-limiting examples illustrate the manufacturing of a chewing gum according to exemplary embodiments of the invention.

Example 1

Gum Base Formulations 001-010

TABLE 1

| | % | | | | | | | | | |
|---|---|---|---|---|---|---|---|---|---|---|
| Raw materials | Comparative base 001 | Base 002 | Base 003 | Base 004 | Base 005 | Base 006 | Base 007 | Base 008 | Base 009 | Base 010 |
| Synthetic elastomer (butyl rubber) | 8 | 8 | 8 | 7 | 8 | 8 | | | 2 | |

TABLE 1-continued

| Raw materials | Comparative base 001 | Base 002 | Base 003 | Base 004 | Base 005 | Base 006 | Base 007 | Base 008 | Base 009 | Base 010 |
|---|---|---|---|---|---|---|---|---|---|---|
| Synthetic high molecular weight elastomer (PIB) | | | | | | | 8 | | | |
| Synthetic elastomer (SBR) | | | | | | | | 4 | | |
| Synthetic elastomer (polyisoprene) | | | | | | | | | 6 | |
| PE elastomer 1 | | 7 | 5 | | | | 7 | 11 | 7 | 15 |
| PE elastomer 2 | | | | 8 | | | | | | |
| PE elastomer 3 | | | | | 7 | | | | | |
| PE elastomer 4 | | | | | | 7 | | | | |
| Medium molecular weight elastomer (PIB) | 7 | | 2 | | | | | | | |
| Natural Resin | 20 | 20 | 20 | 20 | 20 | 20 | 20 | 20 | 20 | 20 |
| PVA | 20 | 20 | 20 | 20 | 20 | 20 | 20 | 20 | 20 | 20 |
| Filler | 20 | 20 | 20 | 20 | 20 | 20 | 20 | 20 | 20 | 20 |
| Emulsifier | 5 | 5 | 5 | 5 | 5 | 5 | 5 | 5 | 5 | 5 |
| Fat | 20 | 20 | 20 | 20 | 20 | 20 | 20 | 20 | 20 | 20 |

The applied gum base formulations were provided according to the values in table 1.

The comparative gum base 001 is a conventional gum base without added PE elastomers.

The PE elastomer 1 is a LDPE with Mw of about 99,000 g/mol.

The PE elastomer 2 is a LDPE with Mw of about 188,000 g/mol.

The PE elastomer 3 is a LLDPE with Mw of about 116,000 g/mol.

The PE elastomer 4 is a LDPE with Mw of about 10,000 g/mol.

Example 2

Chewing Gum Formulations 101-110

TABLE 2

All chewing gums were manufactured by the same recipe as indicated herein.

| Raw materials, % | Chewing gum |
|---|---|
| Gum base | 40% |
| Sorbitol | 45.6% |
| Xylitol | 6% |
| Maltitol syrup | 6% |
| Peppermint | 1.5% |
| Menthol Crystals | 0.5% |
| Aspartame | 0.2% |
| Acesulfame-K | 0.2% |

Gum base 001 corresponds to chewing gum 101, 002 to 102 etc.

The applied chewing gum formulations are provided according to the values in table 2. The process of providing the chewing gums in table 2 is disclosed below as a two step batch mixing process in example 3 and a continuous mixing process in example 4.

Peppermint was added as flavor in all chewing gum formulations. Obviously any other flavor may be added within the scope of the invention, such as strawberry, lemon, etc., and optionally the flavors may include flavor enhancing acids such as citric acid, malic acid and the like.

Example 3

Batch Mixing

Batch Mixing of Gum Base

Ten gum bases for chewing gum were manufactured according to the formulation provided in example 1.

Ten gum bases, comparative base 001 and bases 002-010 were provided according to the following process. The gum bases were made in a batch mixer provided with mixing means like e.g. horizontally placed Z-shaped arms. The mixer had been preheated for 15 min to a temperature of about 100-120° C.

For all gum bases, first the high Mw elastomer, PE, filler and half of the PVA are added and mixed for 25 min. The remaining part of the PVA is added and mixed for another 5 min. Then the natural resin is added and mixed for another 10 min. The medium Mw elastomer is added (only bases 001 and 003 and in base 006 the PE) and mixed for 10 min and finally the fat and emulsifier are slowly added and mixed for another 20 min.

Batch mixing of Chewing Gum:

Ten chewing gums were manufactured according to the formulation provided in table 2 of example 2. The chewing gum products were prepared as follows:

Ten batches, one for each of the abovementioned chewing gums, were made in a batch mixer provided with mixing means like e.g. horizontally placed Z-shaped arms. The mixer had been preheated for 15 min to a temperature of about 40-60° C. An alternative applicable method would be to make the chewing gum in one step, immediately after preparation of gum base in the same mixer where the gum base and mixer had a temperature of less than 60° C.

One half portion of the sorbitol was added together with the gum base and mixed for about 6 min. Maltitol syrup was added and mixed well for about 3 min. The remaining half portion of sorbitol was added and mixed for 1 minute, and then the xylitol was added and mixed for about 4 min.

Peppermint flavor and menthol is then added to provide peppermint chewing gums. The flavor and menthol were added to the mixer and mixed for about 4 min. Then aspartame and acesulfame were added to the mixer and mixed for 2 min. The resulting gum mixture was then discharged and transferred to a pan at a temperature of 40-48° C. The gum was then rolled and scored into cores.

Other forms such as sticks, balls, cubes or any other desired shape could be applied as well, and optionally followed by coating and polishing processes prior to packaging.

Example 4

Continuous Mixing

Continuous Mixing of Gum Base:

Continuous mixing may be performed as described in U.S. Pat. No. 6,630,182, incorporated herein by reference.

An extruder apparatus, in this case a Leistritz co-rotational twin screw mixing extruder but the apparatus is not limiting for the invention, is used for the continuous mixing of chewing gum. The extruder is here divided into 10 barrels/heating zones and the screw design is optimized by proper combination of various screw elements including conveying elements, reverse conveying elements, kneading discs and blocks, and mixing elements. For a further detailed description see e.g. U.S. Pat. No. 6,630,182 column 4. The mixing speed is 80-120 rpm and gravitational (loss in weight) feeders are used.

The 10 barrels have individual purposes as listed below:
Barrel 1. Adding of high Mw elastomer and/or PE, filler and half the PVA, T=25° C.
Barrel 2+3. Mixing and kneading, T=80° C.
Barrel 4. Adding rest of PVA and natural resin using a side feeder, T=120° C.
Barrel 5. Mixing, T=120° C.
Barrel 6. Adding medium Mw elastomer, T=120° C.
Barrel 7. Adding solid fat and emulsifier using a side feeder, T=120° C.
Barrel 8. Adding liquid fat, T=120° C.
Barrel 9+10. Mixing, T=120° C.

Following the mixing process, the gum base product is discharged to form a slab. Alternatively, the finished gum base can be run through a pelletizing system. The resulting gum base is then ready to be used in the manufacturing of the chewing gum as described next.

Continuous Mixing of Chewing Gum:

An extruder apparatus, in this case a Leistritz co-rotational twin screw mixing extruder but the apparatus is not limiting for the invention, is used for the continuous mixing of chewing gum. In the present example the extruder is divided into 10 barrels/heating zones and the screw design is optimized by proper combination of various screw elements including conveying elements, reverse conveying elements, kneading discs and blocks, and mixing elements. For a further detailed description see e.g. U.S. Pat. No. 6,630,182 column 4. The mixing speed is 80-120 rpm and gravitational (loss in weight) feeders are used.

The 10 barrels have individual purposes as listed below:
Barrel 1. Adding gum base and half the sorbitol, T=25° C.
Barrel 2+3. Mixing and kneading, T=40° C.
Barrel 4. Adding rest of sorbitol using a side feeder, T=40° C.
Barrel 5. Mixing, T=40° C.
Barrel 6. Adding maltitol syrup, T=40° C.
Barrel 7. Adding xylitol, aspartame, acesulfame in addition to menthol (peppermint gum) or malic acid and citric acid (strawberry gum) using a side feeder, T=40° C.
Barrel 8. Adding flavor (peppermint/strawberry), T=40° C.
Barrel 9+10. Mixing, T=40° C.

Following the mixing process the chewing gum product is discharged to be rolled, scored etc.

Example 5

Evaluation of the Various Chewing Gums of Example 2

Chewing gum 102 is made on the basis of gum base 002. In comparison with the comparative chewing gum 101 made on the basis of gum base 001, the medium molecular weight elastomer is replaced by PE elastomer with a molecular weight Mw of about 99,000.

A sensory evaluation test was carried out to compare the chewing gums 101 and 102 with regard to softness, sweetness and elasticity.

FIG. 1 illustrates the result of the sensory evaluation test with regard to softness intensity. 101 is the comparative chewing gum and 102 is the chewing gum with medium molecular weight elastomer replaced with PE as elastomer.

The softness intensity profile for 102 is seen to be only slightly lower than 101 over the entire range. Actually an advantage is seen from 102 in comparison with 101, that is that the softness over time decreases for the comparative chewing gum, whereas the softness intensity is rather constant posterior to the initial chewing phase for the chewing gum comprising PE as elastomer.

FIG. 2 illustrates the result of the sensory evaluation test with regard to sweetness intensity.

The sweetness intensity graph shows that 102 has a faster sweetness response when put into the mouth of the consumer. Although the sweetness intensity for 102 is a little lower in the long run, the sweetness intensity over the range is seen to be acceptable in a chewing gum.

FIG. 3 illustrates the result of the sensory evaluation test with regard to elasticity intensity.

Regarding elasticity it is seen that over the range the elasticity of 101 and 102 is similar and hence a chewing gum with a high amount of PE elastomer is acceptable.

Chewing gums 103-105 are made on the basis of gum base 003-005. These show that the samples comprising PE elastomer with Mw of 99,000, 188,000 and 116,000 g/mol, respectively, were not differing much from chewing gum 102 with regard to chewing texture, rheology etc.

However, the sample 106 comprising PE elastomer with Mw of 10,000 g/mol was not successful. The chewing gum 106 did not possess the same texture properties as sample 102. This low molecular weight PE resulted in a non-elastic chewing gum and a plastic feeling when chewing.

Chewing gums 107-109 are made on the basis of gum base 007-009. These samples showed that synthetic elastomers chosen among butyl rubber, PIB, SBR and polyisoprene may advantageously be applied in combination with PE without loss of the advantages already discussed above with chewing gum 102.

Chewing gum 110 is made on the basis of gum base 010. This chewing gum comprised 100% PE as the elastomeric content. This resulted in a chewing gum with unsatisfying elastic properties. Hence the application of PE as elastomer is advantageously combined with another synthetic elastomer.

It is moreover noted, that the chewing gum 103 showed that combinations of more than one synthetic elastomer besides PE (here butyl rubber combined with medium molecular weight PIB) are successful.

In total it is observed that a high percentage of polyethylene of the total elastomeric content of the chewing gum results in advantageous properties regarding elasticity, release and rheology, provided that at least a relatively small amount of other synthetic elastomers were present.

Example 6

Evaluation of Further Chewing Gums

Further variations of the Chewing gums of example 2 were tested.

A chewing gum comprising polyethylene as 80% of the elastomeric content was manufactured wherein the remaining 20% of the elastomeric content was butyl rubber. This amount of polyethylene in the chewing gum still showed advantageous by having good rheological properties and a satisfying release profile.

A chewing gum comprising 50% PE, 25% butyl rubber and 25% high molecular weight PIB (percent of the total elastomeric content of the chewing gum) was manufactured. This combination of three synthetic elastomers showed advantageous and indicated that any combination of the further synthetic elastomers may be added to show advantageous results.

A chewing gum comprising polyethylene as 20% of the elastomeric content was manufactured wherein the remaining 80% of the elastomeric content was butyl rubber. This amount of polyethylene in the chewing gum resulted in a chewing gum with excellent properties, however the cost-reduction was not as advantageous as for higher amounts of polyethylene.

The invention claimed is:

1. A chewing gum comprising a gum base having an elastomer content comprising (A) at least one polyethylene (PE) polymer in an amount from about 30% to about 70% by weight of the elastomeric polymer content of said chewing gum, and (B) at least one synthetic elastomer chosen from the group of polyisobutylene (FIB), butyl rubber, polyisoprene and styrene butadiene rubber (SBR) and any combination of these, in an amount from about 20% to about 85% by weight of the elastomeric polymer content of said chewing gum; and wherein said at least one polyethylene polymer has a molecular weight (Mw) above 75,000 g/mol; and wherein said at least one polyethylene polymer is present in an amount from 2% to 15% by weight of the gum base;

wherein said at least one polyethylene polymer is present in an amount from 1.5% to 4% by weight of the chewing gum;

wherein said at least one polyethylene polymer is chosen from the group consisting of low density polyethylene (LDPE), medium density polyethylene (MDPE), very low density polyethylene (VLDPE) and linear low density polyethylene (LLDPE);

wherein said at least one polyethylene polymer has a density between 0.880 g/cm$^3$ and 0.940 g/cm$^3$; and wherein said at least one polyethylene polymer has a crystallinity of less than 30% or is amorphous.

2. The chewing gum according to claim 1, wherein said at least one polyethylene polymer has a crystallinity of less than 10%.

3. The chewing gum according to claim 1, wherein said at least one polyethylene polymer is amorphous.

4. The chewing gum according to claim 1, wherein the chewing gum further comprises synthetic and/or natural resin in an amount of about 5 to about 70% of said gum base.

5. The chewing gum according to claim 1, wherein the chewing gum further comprises synthetic and/or natural resin in an amount of about 5 to about 20% of said chewing gum.

6. The chewing gum according to claim 5, wherein the resin is PVA or terpene resins or any combination thereof.

7. The chewing gum according to claim 5, wherein the resin is ester gum.

8. The chewing gum according to claim 5, wherein the synthetic and/or natural resins have a molecular weight (Mn) of about 500 to about 200,000 g/mol.

9. The chewing gum according to claim 5, wherein the chewing gum comprises a mixture of synthetic and/or natural resins in a ratio between 1:20 and 20:1.

10. The chewing gum according to claim 1, wherein the at least one synthetic elastomer is butyl rubber.

11. The chewing gum according to claim 1, wherein the at least one synthetic elastomer is polyisoprene.

12. The chewing gum according to claim 1, wherein the at least one synthetic elastomer is styrene butadiene rubber (SBR).

13. The chewing gum according to claim 1, wherein the at least one synthetic elastomer is polyisobutylene (PIB).

* * * * *